(12) United States Patent
Jones et al.

(10) Patent No.: US 6,843,590 B2
(45) Date of Patent: Jan. 18, 2005

(54) WAVEGUIDE BASED LIGHT SOURCE

(75) Inventors: Michieal L. Jones, Davis, CA (US); Steven M. Jaffe, Mountain View, CA (US); Brian L. Olmsted, Fairport, NY (US)

(73) Assignee: Quantum Vision, Inc., Sunnyvale, CA (US)

( * ) Notice: Subject to any disclaimer, the term of this patent is extended or adjusted under 35 U.S.C. 154(b) by 187 days.

(21) Appl. No.: 09/855,254

(22) Filed: May 15, 2001

(65) Prior Publication Data

US 2003/0044160 A1 Mar. 6, 2003

Related U.S. Application Data

(60) Provisional application No. 60/204,645, filed on May 17, 2000.

(51) Int. Cl.[7] ................................................. F21V 8/00
(52) U.S. Cl. ........................ 362/554; 362/556; 362/84; 385/129; 385/131
(58) Field of Search ................................ 362/551, 554, 362/556, 26, 84; 385/123, 901, 147, 129, 131

(56) References Cited

U.S. PATENT DOCUMENTS

| | | | |
|---|---|---|---|
| 4,510,555 A | 4/1985 | Mori | 362/32 |
| 4,626,068 A | 12/1986 | Caldwell | 350/96.34 |
| 5,469,018 A | 11/1995 | Jacobsen et al. | 313/461 |
| 5,542,016 A | 7/1996 | Kaschke | 385/123 |
| 5,616,986 A | 4/1997 | Jacobsen et al. | 313/461 |
| 5,669,692 A | 9/1997 | Thorgersen et al. | 362/26 |
| 5,804,919 A | 9/1998 | Jacobsen et al. | 313/506 |
| 5,955,839 A | 9/1999 | Jaffe et al. | 313/578 |
| 6,198,211 B1 | 3/2001 | Jaffe et al. | 313/461 |
| 6,299,338 B1 * | 10/2001 | Levinson et al. | 362/559 |

OTHER PUBLICATIONS

*Digital Optics Corporation*, product literature, Oct. 19, 1994, 1 page.

Hecht, Jeff, "Diverse fiberoptic systems require varied sources," *Laser Focus World*, Jan. 2000, pp. 155–161.

* cited by examiner

Primary Examiner—Thomas M. Sember
(74) Attorney, Agent, or Firm—Fliesler Meyer LLP

(57) ABSTRACT

A wave guide based light source having a phosphor film with a large two-dimensional extent and a small thickness. The phosphor film is excited by an excitation means.

19 Claims, 3 Drawing Sheets

WAVEGUIDE BASED LIGHT SOURCE

This application claims priority to an earlier filed Provisional patent application, S/C No. 60/204,645 filed May 17, 2000.

FIELD OF THE INVENTION

The present invention relates to a light source comprising a phosphor film and a method of concentrating the emitted light.

BACKGROUND OF THE INVENTION

High brightness light sources are needed for many applications including optical fiber illumination and image projection. In optical fiber illumination, particularly for telecommunications applications, light-emitting diodes (LEDs), and semiconductor diode lasers are the dominant light sources as described in the article of Hecht, which is attached hereto and incorporated herein by reference (see Hecht, Jeff, *Back to Basics: Fiber-optic Light Sources*, Laser Focus World, January 2000). The output power density of LEDs is generally too low for most fiber illumination applications. Semiconductor diode lasers have many favorable characteristics for fiber illumination. Inexpensive diode lasers are readily available in red or near-infrared wavelengths. However, semiconductor diode lasers suitable for many other applications are either not available or very expensive to produce.

For a variety of reasons, lasers and LEDs are rarely used as light sources for image projection The primary reason is the high cost of lasers and LEDs capable of producing the high total outputs needed, especially one to several watts of blue light. In addition, coherent light sources such as lasers can produce artifacts in many projection applications. For these reasons the dominant light source for projection is the arc lamp.

Arc lamps are capable of the brightness and total luminous output required for almost any projection need. Indeed arc lamps are partially responsible for the great success of the movie industry in the 20th century. However, arc lamps are considered too expensive for use in many consumer devices. In addition, the wide spread use of arc lamps in consumer devices would pose a new set of safety problems.

In an issued U.S. Pat. No. 5,469,018, which is incorporated herein by reference, a Resonant Microcavity Display was disclosed. A resonant microcavity display is a light source incorporating a thin film phosphor embedded in a microcavity resonator. The microcavity resonator consists of an active region surrounded by reflectors. The dimensions are chosen such that a resonant standing wave or traveling wave is produced by the reflectors. The methods described lead to the emission of strong and controlled radiative modes. This is in contrast to a bare thin film phosphor (which is not provided in a microcavity) which generates strong emission into waveguide modes (i.e., the emissions travel along the material), but only weak and diffuse radiative emissions (i.e., for example perpendicular to the material).

A light source is formed by coupling an excitation source to the microcavity structure. The phosphor inside the microcavity may be excited through several means including bombardment by externally generated electrons (cathodoluminescence), excitation by electrodes placed across the active layer to create an electric field (electroluminescence) or excitation using photons (photoluminescence).

Phosphors in general are restricted in the power density of excitation and emission due to multiple causes. Phosphors are typically insulating materials with relatively low thermal conductivities. In addition, many phosphors exhibit relatively long emission times which limit the number of photons each luminescence center may produce in a given time. Due to these restrictions, phosphors may rarely be excited at levels greater than 1 W per square cm resulting in a emission level rarely greater than 100 MW per square cm. For these reasons phosphor based devices have been difficult to utilize in high brightness applications such as fiber illumination or film projection.

SUMMARY OF THE INVENTION

An embodiment of the present invention consists of a relatively large area of phosphor film excited through, by way of example only, conventional broad area means. The device may be many square centimeters in extent allowing for high power excitation and emission. The embodiment is formed such that a substantial amount of the light emitted by the phosphor is confined to one or more guided modes with a very small cross section. These guided modes exit the device through one or more regions of similarly small cross section resulting in extremely high brightness.

Other objects and advantages of the present invention will become apparent to those skilled in the art from the following detailed description of the preferred embodiments, when read in light of the accompanying drawings.

DETAILED DESCRIPTION OF THE PREFERRED EMBODIMENT

In the preferred embodiment the construction of the device is such that the guided modes have two dimensions which are of the order of a wavelength of light. One of these dimensions is given by the thickness 12, 14 of the thin film layer 16, 18 involved. This small dimension or thickness 12 can be formed by in-plane patterning.

The other in-plane dimension 20, 22 is sufficiently long in extent to produce a total area which may be many square centimeters. This one long dimension 20, 22 may consist of spirals or parallel lines so that a circular, rectangle, or other simple shape or surface area is substantially filled allowing for efficient broad area excitation.

Figure 1:
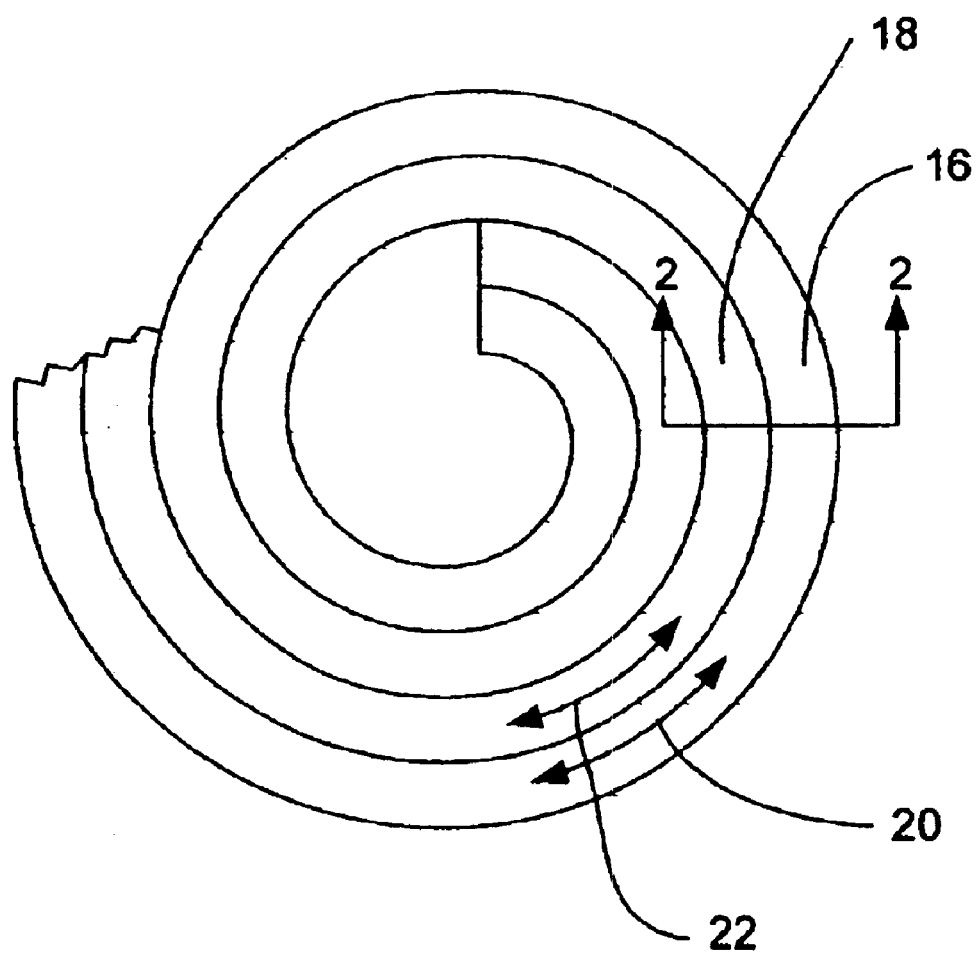
FIG. 1 illustrates an embodiment of a spiral shaped dual waveguide structures of the invention.

The emitted light travels along the spirals or parallel lines and exits the device through "openings" approximately the same size as the small dimensions 12, 18 of the waveguide. FIG. 1 illustrates this spiral waveguide and is similar in appearance to a coiled garden hose.

Figure 2:
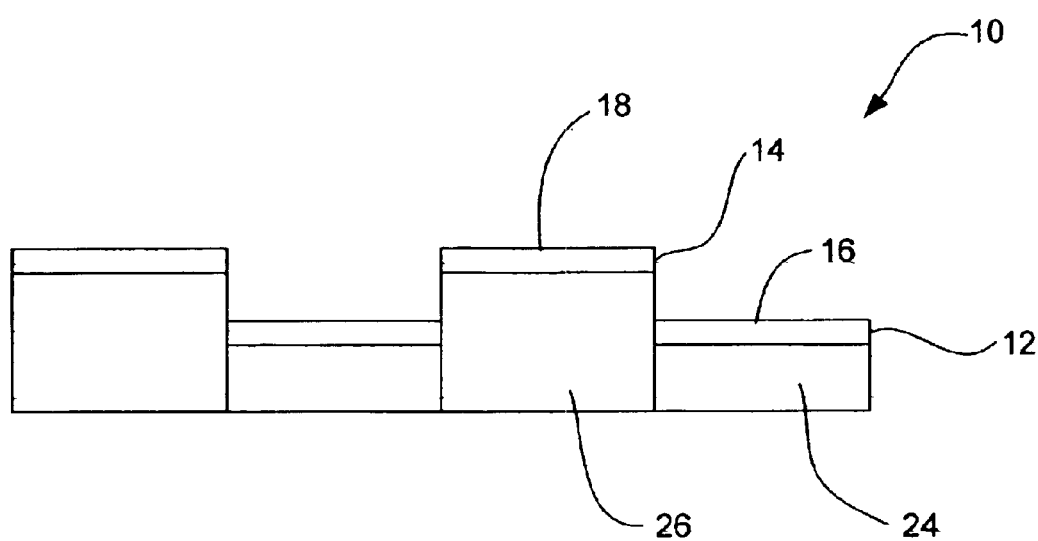
FIG. 2 illustrates a cross-sectional view of the embodiment of the dual waveguide structure of FIG. 1.

In the simplest embodiment, a spiral is formed on a low index buffer layer or a low index substrate 24, 26 using standard techniques common in the semiconductor or holographic optics industry (see Digital Optics Corporation Standard Program dated Oct. 19, 1994 attached hereto and incorporated by reference). As illustrated in FIG. 2, an example of a spiral embodiment consists of two parallel intertwined channels 24, 26, one recessed below the other by a depth greater than the thickness of the waveguide to be formed. In the preferred embodiment, the depth and width of these features shall be of the order of a wavelength of the light to be emitted.

A higher index phosphor layer 16, 18 is deposited onto this substrate 24, 26 using any appropriate technique of thin film growth including but not limited to sputtering or evaporation. This layer may consist of a wide range of phosphors (e.g. sulfides, oxides, silicates, oxysulfides, and aluminates) most commonly activated with transition metals, rare earths or color centers. The deposited phosphor layer matches the relief pattern of the underlying structure so that two spiral waveguides are formed. One waveguide spiral 18 is elevated with a low index mesa underneath and air, another gas, or a vacuum, on the sides and above. The other waveguide spiral 16 is recessed with low index underneath, low index mesas on either side and air, another gas or a vacuum, above. In other embodiments, a specific high-index waveguide layer may be grown and this layer followed by a layer of phosphor which is formed so as to optically couple to the waveguide layer.

The guided modes may be confined strictly to the phosphor or may reside primarily in a separate waveguide adjacent to the phosphor layer with a mechanism for coupling guided modes of the phosphor layer to modes of the waveguide structure.

Figure 4:
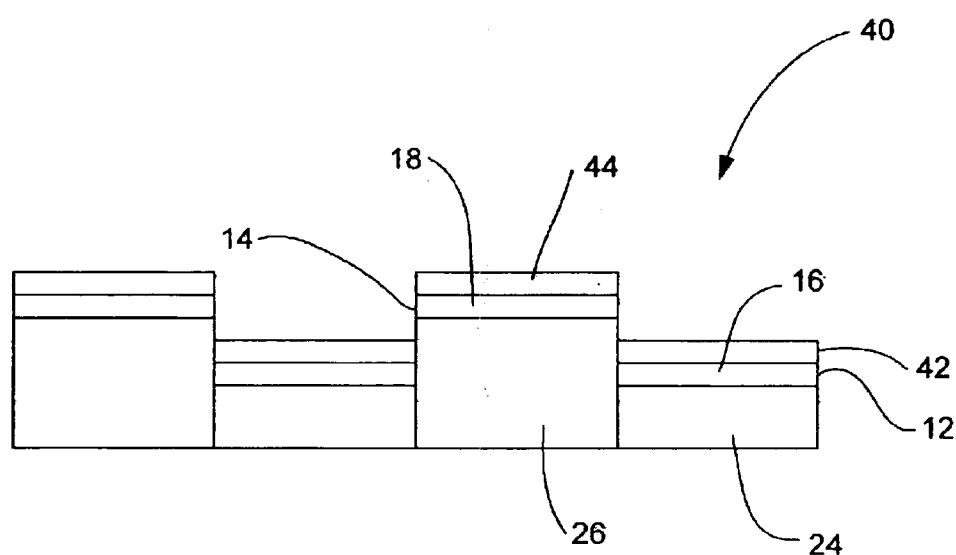
FIG. 4 illustrates a cross-section of yet another dual wave guide structure with a separate wave guide structure located adjacent to the phosphor layer.
Figure 5:
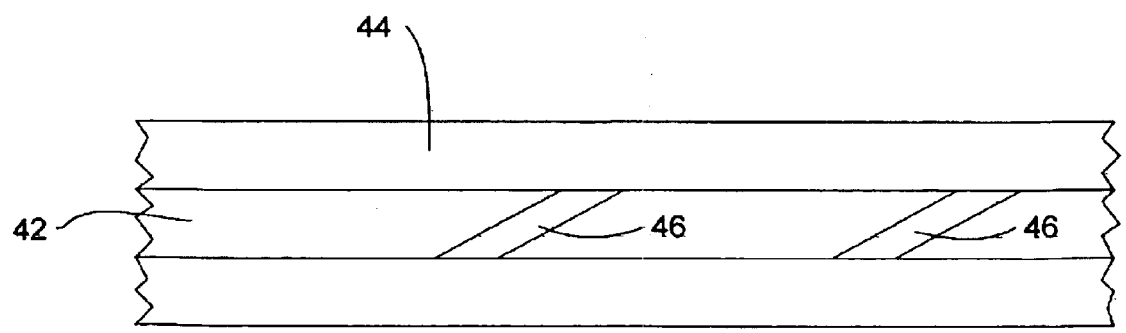
FIG. 5 is a side view of one of the dual wave guide channel of FIG. 4.

FIG. 4 depicts a dual wave guide structure 40 which includes a phosphor wave guide structure 42 and a separate wave guide structure 44 adjacent thereto. In a preferred embodiment, the separate wave guide structure 44 is comprised of a fiber optics wave guide structure. It is to be understood that the fiber optics wave guide structure can be made with substantially fewer impurities than the phosphor wave guide structure. Accordingly, the fiber optics wave guide structure 44 can transmit light much longer distances due to the fact that the absorption problems which may be present with the phosphor of that structure are not present with the fiber optic wave guide structure. The phosphor wave guide structure is coupled to the fiber optics wave guide structure by ramps or reflectors such as the aluminum reflectors as previously discussed and as depicted in FIG. 5. In FIG. 5 the deflector is identified by number 46. It is to be understood that in this embodiment, the phosphor wave guide structures 42 can be composed of a multiplicity of discrete segments each with a transition or ramp to the fiber optics wave guide structure 44. This can increase light output should the phosphor wave guide structure 42 absorb light to a high degree. In this situation the phosphor wave guide structure 42 and in particular each spiral would be divided into many segments, each with a ramp 46 which would direct the generated light to the, preferably continuous, fiber optics wave guide structure.

Figure 3:
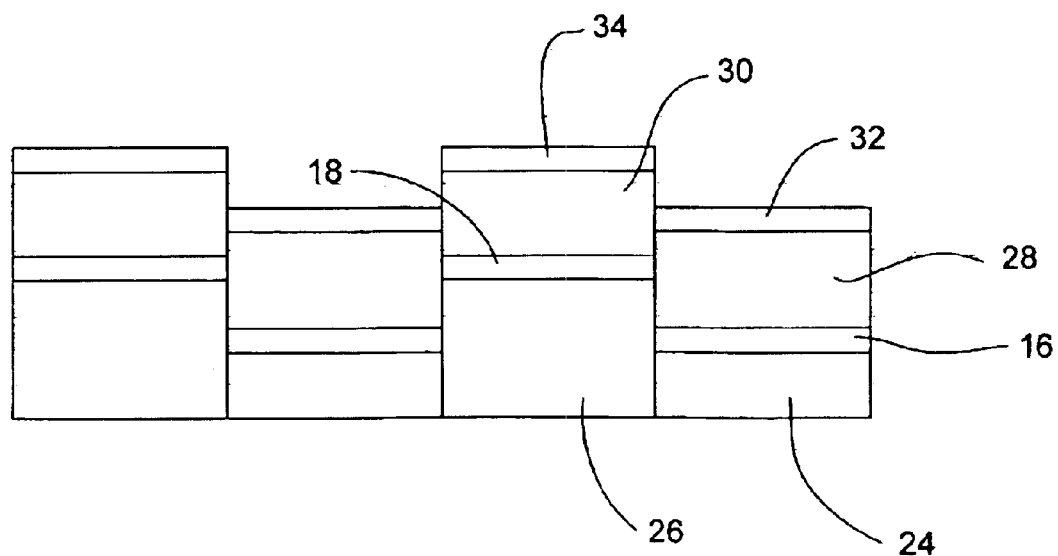
FIG. 3 illustrates a cross-sectional view of another embodiment of a dual wave guide structure with a conducting layer.

In the preferred embodiment FIG. 3, a buffer layer 28, 30 of low index material is deposited onto the phosphor followed by a conducting layer 32 and 34, such as for example an aluminum layer. The buffer layer is between the phosphor layer and the conducting layer since although the aluminum conducting layer is principally reflective, it does absorb light, reducing the efficiency of the embodiment. This embodiment allows the structure to form an anode for electron beam excitation from the top side. This e-beam excitation may consist of a broad area cathode as is used in vacuum fluorescent displays or field-emission displays (FEDs), or a conventional CRT operated as a flood gun. Appropriate means may be provided for excitation by other mechanisms.

The inner and outer ends of each spiral may be terminated with tapers or ramps as part of the substrate patterned structure or may be cleaved or otherwise formed after growth. Alternatively an aluminum taper at a 45° angle or other appropriate angle can reflect light generated in a phosphorous spiral, for example, a fiber optic wave guide as described below. These outputs from the taper or ramp termination may be combined using standard waveguide or fiber optics couplers or may be utilized separately. Fiber optics can be made with reflection high purity in comparison to phosphor layer, and thus light generated in the phosphor layer can be transferred to the fiber optics for substantially loss free communication to a desired location. In other embodiments, other techniques for coupling the light from the waveguides such as wavelength selective gratings may be used. With such gratings, each light frequency bounces off the grating at a different angle and thus the light can be appropriately separated. Thus the grating can be used to couple light output to other structures, such as other wave guide structures.

It is to be understood that QED principles can be used to enhance the generation of light for the wave guide structure.
Industrial Applicability:

A light source for telecommunications applications may be created by combining the thin film light source with an appropriate modulator utilizing electro-absorption, electro-optic or other effects. The waveguide formed may be specifically designed to allow coupling to a telecommunications fiber. The wide range of phosphors available allows for the generation of light at many different wavelengths, in particular erbium doped phosphors may be used to generate light within the low absorption band of silica fibers near 1.5 micrometer. Other phosphors may be used to generate light within the low dispersion band near 1.3 micrometers.

A high intensity light source coupled to a fiber optic may be utilized for a variety of medical applications including invasive surgery. In particular phosphors may be selected for the specific purposes of activating photosensitive compounds, or for interaction with specific tissues, cell types or chemicals.

The high brightness light source of the preferred embodiment may be utilized as an illumination source for an electronic projection display. Separate red, green, and blue sources may be formed and coupled to image forming devices such as liquid crystal arrays or digital micromirror arrays. Through modulation of the excitation source or external modulation of the generated light, separate color sources may be rapidly switched allowing use in a single chip digital micromirror projector. An array of small light sources may be formed through patterning so that separate light sources are available for each pixel element of an image forming device. That is to say that each pixel can include a spiral of a phosphor material much as shown in FIGS. 1, 2. If a pixel were one hundred microns across, the spiral would be one hundred microns across. An e-beam could be a source of energy used to excite selected pixels. Each spiral could have a taper, ramp or reflector to reflect the generated light perpendicular to that plane of the coil and selectively illuminate each pixel. If an addressable excitation source such as a raster scanned CRT or an FED is utilized, this array of small light sources may be utilized to form a display without the imposition of an additional image forming device. Additionally it is to be understood that flood lamps could be used with this technology.

It is to be understood that other embodiments of the invention can be developed and fall within the spirit and scope of the invention and claims.

We claim:

1. A light source comprising:
   a substrate and a phosphor material that has a waveguide formed therein, the waveguide having a substantially planar shape and further having a waveguide direction along a longitudinal dimension and an exit region at an end of the longitudinal dimension; and
   an excitation source that applies excitation energy to the waveguide in a direction substantially sheer or perpendicular to the plane of the waveguide such that light is generated within the phosphor material in a direction within or parallel to the waveguide direction, and exits through the exit region.

2. The light source of claim 1 wherein said waveguide is comprised of a spiral.

3. The light source of claim 1 wherein the waveguide is comprised of multiple spirals configured about the same center.

4. The light source of claim 1 wherein said waveguide has a small cross-section in relationship to a large longitudinal dimension.

5. The light source of claim 1 wherein said excitation source is an electron beam.

6. The light source of claim 1 wherein said excitation source is light.

7. The light source of claim 1 wherein said excitation source is an alternating electric field.

8. The light source of claim 1 wherein said waveguide is constructed to control the spontaneous emission rate of the phosphor in the phosphor region.

9. The light source of claim 1 wherein the one of the dimensions of the waveguide is on the order of a wavelength of light.

10. The light source of claim 1 wherein mirrors are placed on one or more sides of the waveguide.

11. The light source of claim 10 wherein said mirrors are comprised of aluminum.

12. The light source of claim 10 wherein said mirrors are comprised of alternating layers of materials with different indicies of refraction.

13. The light source of claim 1 including another waveguide associated with the waveguide with the phosphor film.

14. The light source of claim 1 including a multiplicity of waveguides, each forming a pixel at the exit region.

15. The light source of claim 1 including at least one of a light on ramp and a light off ramp associated with the waveguide.

16. A light source comprising:
    a phosphor film which has a substantially planar shape, and both a long dimension and a small cross-section, the phosphor film having at least one waveguide mode in the long dimension; and
    an excitation source that directs excitation energy at the phosphor film in a direction substantially sheer or perpendicular to the direction of the long dimension such that light is generated in a waveguide mode within the long dimension and exits an exit region at the end of the long dimension.

17. The light source of claim 16 including at least one of a light on ramp and a light off ramp associated with the phosphor film.

18. The light source of claim 16 wherein the waveguide is comprised of a spiral.

19. A light source comprising:
    a waveguide substrate having two dimensions on the order of a wavelength of emitted light, and a third dimension sufficiently long to produce a surface area on the order of many square centimeters;
    a phosphor film disposed on the waveguide substrate and having a waveguide direction parallel to the third dimension, the phosphor film having a guided mode such that excitation energy received by the phosphor film in a direction substantially sheer or perpendicular to the waveguide direction generates light in the phosphor film that travels in the phosphor film in the waveguide direction and exits through an exit region along the waveguide direction; and
    said light source further including at least one of a light on ramp and a light off ramp associated with the phosphor film.

* * * * *